United States Patent [19]

Pitt et al.

[11] Patent Number: 5,280,480
[45] Date of Patent: Jan. 18, 1994

[54] SOURCE ROUTING TRANSPARENT BRIDGE

[75] Inventors: Daniel A. Pitt, Thalwil, Switzerland; Kirk A. Preiss, Raleigh, N.C.

[73] Assignee: International Business Machines Corporation, Armonk, N.Y.

[21] Appl. No.: 658,945

[22] Filed: Feb. 21, 1991

[51] Int. Cl.$^5$ .......................................... H04L 12/40
[52] U.S. Cl. ................... 370/85.13; 370/94.3; 340/825.02
[58] Field of Search ............... 370/85.13, 84.14, 85.15, 370/85.12, 16, 94.3, 85.6; 340/825.05, 825.50, 825.51, 825.02, 827

[56] References Cited

U.S. PATENT DOCUMENTS

| | | | |
|---|---|---|---|
| 4,706,081 | 11/1987 | Hart et al. | 370/85.13 |
| 5,018,133 | 5/1991 | Tsukakoshi et al. | 370/85.13 |
| 5,058,109 | 10/1991 | Goldberg et al. | 370/85.13 |
| 5,086,428 | 2/1992 | Tsukakoshi et al. | 370/85.13 |
| 5,088,090 | 2/1992 | Yacoby | 370/85.13 |
| 5,111,453 | 5/1992 | Morrow | 370/85.13 |

Primary Examiner—Douglas W. Olms
Assistant Examiner—Dang Ton
Attorney, Agent, or Firm—Joscelyn G. Cockburn

[57] ABSTRACT

A bridged communications network includes source routing transparent (SRT) bridges which forward frames that are structured in accordance with a source routing architecture and frames that are structured in accordance with a transparent bridging architecture. Each SRT bridge examines a received frame to determine its type. If the frame is a bridge protocol data unit (BPDU) frame, it is used to set the bridge in a forwarding or blocking state. Any non-BPDU which carries a routing information indicator (RII) bit set to a logical "1" are processed by a source routing function device which is provided in the SRT bridge. If the RII bit is set to logical "0", the frame is processed by a transparent bridge function device which is also provided in the SRT bridge.

7 Claims, 8 Drawing Sheets

SOURCE ROUTING TRANSPARENT BRIDGE

BACKGROUND OF THE INVENTION

1. Field of the Invention

The present invention relates to communications networks in general and more particularly to interconnected communications networks.

2. Prior Art

It is well known in the prior art to interconnect a plurality of stations to allow them to communicate with one another. If the configuration is limited to a relatively small geographical area (such as a building, college campus, etc.), it is called a Local Area Network (LAN). A typical LAN includes a communications media interconnecting a number of stations. For maximum efficiency, each LAN has a maximum number of stations which it can support. If the number of stations exceeds the maximum limit, the efficiency of the LAN goes down. Depending on the use and/or configuration of the LAN, there are times when the load (number of stations) has to be maintained below the maximum limit. In other words, there are times when the number of stations are fewer than the maximum number allowed for that particular LAN.

Usually, if the total number of stations cannot be supported on a single LAN, additional LANS are provided in the same geographical area. It is known that such LANs may themselves be interconnected by interconnecting devices sometimes called "bridges" or "gateways", etc. The interconnected LANS form a unified or combined network in which stations on one LAN may communicate with stations on other LANS. The interconnecting devices are usually of the store-and-forward type which forwards messages received from one LAN onto the other.

The prior art provides two bridging architectures which can be used to interconnect LANs. The two architectures are "Source Routing" and "Transparent Bridging". Both prior art architectures and related protocols are fully described in the literature to be identified hereafter. Therefore, only a short description of each of the two architectures will be given here in order to identify the environment in which applicants' invention is used.

In the "Source Routing" architecture and related protocols, the specific route which a frame must traverse between one end station called the "Source" and another end station called the "Destination" is carried in the frame. Prior to issuing the frame with routing information, the "source station" issues an "explorer frame" which is propagated throughout the network to the destination station. As the explorer frame traverses the network, the bridge enters routing information such as bridge identification number, LAN number, etc. On arriving on the destination LAN, the explorer frame is copied by the destination station and is rerouted via the specific route to the origination station which stores the route information and uses it to send subsequent messages to the destination station. A more detailed description of the source routing architecture and protocol is set forth in various IEEE 802.1 and IEEE 802.5 draft standards for MAC bridges and Token Ring LANs and in an article entitled, "Table-Free Bridging" by Daniel Pitt and Jacalyn L. Winkler, (IEEE Journal on Selected Areas in Communication, Vol. SAC-5, No. 9, December, 1987, pp. 1454-1462).

In the transparent bridging architecture and related protocols, the routing information is not carried in the frame. Instead, the source address in each frame and address tables in the interconnecting bridge are used to forward the frame from one LAN to another. In particular, the addresses of stations which are connected to respective bridged LANs are recorded and maintained in separate tables which are generated in the interconnecting bridge. When a source station on a first LAN wishes to communicate with a destination station located on another LAN, the destination address of the destination station is included in the frame. The interconnection bridge, on receiving the frame, compares the destination address with address entries in the address table which is associated with the first LAN. If a match is not made and the bridge is in a "forwarding state", the frame is forwarded to the other LAN. A more detailed description of the transparent bridge architecture and related protocols are set forth in International Standard ISO 10038 (IEEE Draft Standard P802.1d/D9). In addition, specific features and implementations of transparent bridging are set forth in U.S. Pat. Nos. 4,597,078 and 4,627,052.

Even though the "source routing" and transparent bridge architectures work well in their respective environments, they are incompatible and could not be used in a bridged heterogeneous communications network. Stated another way, communications networks which use different bridging architectures could not be easily interconnected. This causes unnecessary restrictions and hardships on users who may elect to interconnect communications networks which use different bridging architectures and protocols.

SUMMARY OF THE PRESENT INVENTION

It is a main objective of the present invention to provide a device and methodology (architecture and related protocols) for bridging LANs which use "source routing" and "transparent bridge" architectures.

It is another object of the present invention to provide an improved interconnected communications network populated by stations which use "source routing" and "transparent bridging architecture".

The device is an improved bridge called a "source routing transparent" (SRT) bridge. The SRT bridge provides a single transmission path between end stations connected to different LANs of a bridged network. As a result of the single path, only a single copy of a frame is forwarded from one LAN to the other. The SRT bridge is provided with a spanning tree means having a spanning tree function (algorithm and related protocols) which interact with like function provided in other bridges to configure the bridges into a "forwarding" or "blocking" state. Bridges which are configured in a "forwarding" state transmit a frame (to be described below) from one LAN to another. On the other hand, bridges which are configured in a blocking state will not transmit frames between LANs.

In addition to the configuration or spanning tree logic means, the components in the bridge include a transparent bridge routing logic means which provides a transparent routing function for forwarding frames based upon the frame destination address and the state of the bridge; a source routing logic means which provides a source routing function for providing frame modification and frame forwarding based upon the setting of the RT bits in a frame, routing information and the state of the bridge; and a frame analyzing means which provides analysis functions for extracting special types of frames including (a) bridge protocol data unit (BPDU) frames which are sent to the spanning tree means and are used to configure the bridge and (b) non-BPDU frames which are sent to the source routing means for further processing if the routing information indicator (RII) bit is set to a logical "1" or to the transparent bridge routing logic means for further processing if the (RII) bit is set to a logical "0".

The frames, also called protocol data unit (PDU), are grouped into four types, namely:

(a) Configuration Bridge Protocol Data Unit (BPDU) which is addressed to a specific well group address. This type of frame is used to configure the bridge.

(b) PDU which is addressed to a specific bridge's individual address.

(c) Broadcast PDU which is addressed to all stations or a group of stations in the network.

(d) Individually addressed PDU which is addressed to a specific end station, not the bridge.

The first two types of PDUs are processed exclusively by the bridge and not forwarded through the bridge. The PDUs are distinguished from one another based upon their addresses. For example, type (a) PDUs are addressed to a specific group address, type (b) PDUs are addressed to a specific individual address (each bridge has a unique address on each connecting LAN for identification purposes) and type (c) PDUs carry a broadcast address which is copied by all stations or a plurality of stations supporting the given group address in the network.

Finally, type (d) PDUs are directed to end stations and carry the end station individual addresses in the destination field of the PDUs. In addition for types c) and d), the RII bit which is located in the source address (SA) field indicates whether the PDU is structured in accordance with the source routing bridging architecture or the transparent bridging architecture. Preferably, the originating end station sets the RII bit to a logical "1" if the PDU adheres to the source routing bridging architecture. The RII bit is set to a logical "0" if the PDU adheres to the transparent bridging architecture.

The PDUs whose RII bit is set to a logical "1" are further classified into three types based upon the setting of 3 bits in the routing type (RT) field. Table I below identifies the frame types and the bit settings.

TABLE I

| Frame Type | Abbreviation | Bit Setting | | |
|---|---|---|---|---|
| Spanning Tree Explorer | STE | 1 | 1 | X |
| All Routes Explorer | ARE | 1 | 0 | X |
| Specifically Routed | SRF | 0 | X | X | where X indicates either 1 or 0 is allowable.

The STE and ARE frames are used by end stations to discover the route to a destination end station. Once the route has been determined, SRF frames are used to send data from source to destination.

When the SRT bridge receives a frame, the frame type is determined. The BPDU frames are distinguished by a special address in the destination address (DA) field. The BPDU frame is sent to the spanning tree logic means which uses the frames to set the bridge in a forward or blocking state. The frame whose RII bit is set to a logical "1" is sent to the source routing logic means which further examines the frame and, depending on its type (STE or ARE or SRF) and the setting of the bridge, the frame is discarded or is forwarded to another LAN. The frame whose RII bit is set to a logical "0" is sent to the transparent bridge logic means which processes the frame in accordance with transparent bridging algorithms and protocols.

DESCRIPTION OF THE PREFERRED EMBODIMENT

The invention to be described can be used to interconnect any type of Local Area Network (LAN). It works well with Token Ring LANs and, as such, will be described in that environment. However, this should not be construed as a limitation of the scope of the present invention, since it is well within the skill of one skilled in the art to use the disclosed invention to interconnect LANs other than Token Ring. Other LANs which the SRT bridge (to be described hereinafter) interconnect are set forth in the IEEE Project 802 (Local Network Standards) which is incorporated herein by reference. As is used herein after "bridge" means, the different types of devices used to interconnect communications networks. The devices include bridges, routers, brouters, etc.

Figure 1:
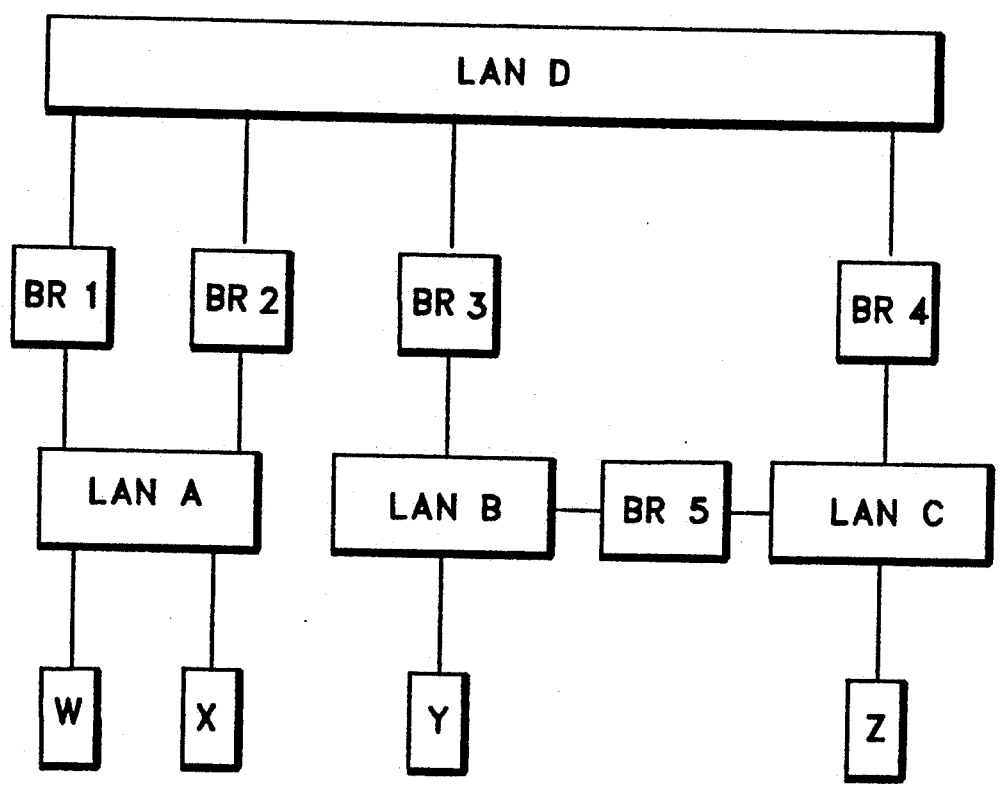
FIG. 1 shows a block diagram of a bridged network embodying the teachings of the present invention.

FIG. 1 shows an interconnected communications network which embodies the teaching of the present invention. The network includes a plurality of LANs identified as LAN A, LAN B, LAN C interconnected by a plurality of bridges identified as BR1, BR2, BR3, BR4 and BR5. BR5 interconnects LAN B and LAN C. LAND, LANA, LANB and LANC are interconnected by BR1, BR2, BR3 and BR4. It should be noted that this configuration of interconnected LANs is only exemplary and should not be construed as a limitation of the scope of the present invention. A plurality of end stations, some of which are shown and identified by alphabetical characters W, X, Y and Z, are connected to respective LANs. Since LAN A supports end station W and end station X, if either end station wishes to communicate with the other, the data is transported on LAN A and is not forwarded through either bridge 1 or bridge 2. However, if end station W wishes to communicate with end station Z, or if end station X wishes to communicate with end station Y, the information has to be transferred via bridges in the network. This is so because the end stations are located on different LANs.

As described previously, prior to source routing transparent (SRT) bridge device (to be described hereinafter), the end stations W, X, Y and Z could communicate across the bridges using only one of the prior art bridging protocols. The prior art bridging protocols consist of the well-known source routing architecture details described in an article entitled, "Table-Free Bridging," by Daniel Pitt and Jacalyn L. Winkler, IEEE Journal on Selected Areas in Communications, (Vol. SAC-5, No. 9, December 1987) and incorporated herein by reference and the transparent bridging architecture details described in IEEE Draft Standard 802.ID/d9 and also incorporated herein by reference.

Figure 8A:
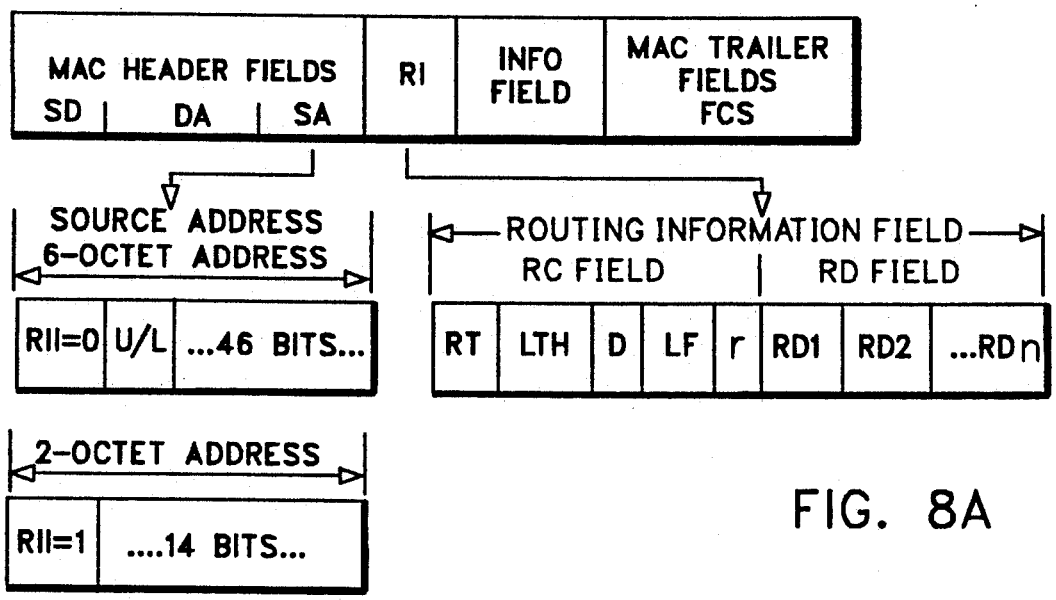
FIG. 8A shows a frame format for source routing architecture.

Each of these bridging protocols has dedicated frame formats which are used for transporting information throughout the network. Referring to FIG. 8A, the source routing frame format includes a routing information (RI) field in which the route that a message must travel from a source end station to a destination end station is included. On the other hand, the transparent bridge frame format (FIG. 8B) has no RI field. Instead, tables at the bridge use the destination address (DA) in the frame to forward a frame from one bridge to another. Other fields which are common to the frame formats of FIGS. 8A and 8B include starting delimiter (SD), destination address (DA), source address (SA), information (INFO), and MAC trailer fields including frame check sequence (FCS). The SD field carries coded information which represents the beginning of a frame. The DA field carries coded information representative of the destination address of the frame. The SA field carries coded information representative of the source address, the INFO field carries the information to be transported between the stations and the FCS field carries coded information which is used to check the accuracy of the transported information. More detailed information about the respective fields are set forth in the above-described Table-Free Bridging article. Referring again to FIG. 1, the SRT bridges which interconnect the network are structured so that an end station may use either the prior art source routing frame or the prior art transparent bridge frame to shuttle information within the network.

Figure 8B:
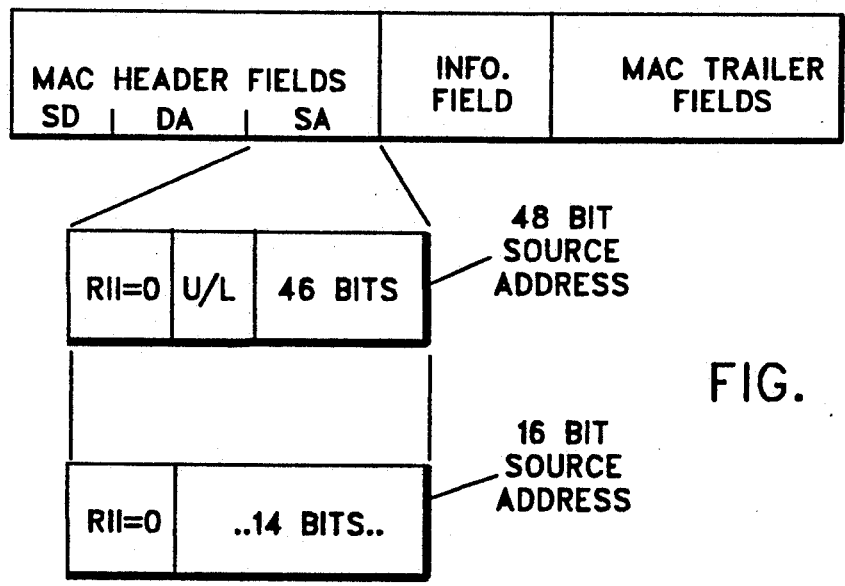
FIG. 8B shows a frame format for transparent bridging architecture.

Still referring to FIGS. 8A and 8B, the routing information indicator (RII) bit in the source address (SA) field is used to indicate whether a frame is a source routing frame or a transparent bridging frame. If the RII bit is set to a logical "1", there is a routing information field which carries routing information. Therefore, the frame is a source routing frame. On the other hand, if the RII bit is set to a logical "0", there is no RI field. Therefore, the frame is a transparent bridging frame. The setting of the bit is done by the end stations and the new features of the SRT bridges (to be described hereinafter) uses among other things the RII bit to channel frames to either a source routing logic means (to be described hereinafter) or the transparent bridge logic means (to be described hereinafter).

Still referring to FIG. 8A, the RII bit and information which is contained in the RI field of the frame are used in the SRT architecture. The routing information field can be broadly divided into a routing control (RC) field and a route designator (RD) field. The RC field carries routing control information. The RT section of the RC field carries a code indicating the type of frame. In particular, the RT section of the RC field carries three bits whose setting designates a different type of frame. These frames are used by end stations that use the prior art source routing architecture and frame format. The above-described table I shows the bit setting and the frame type which each one represents. The spanning tree explorer (STE) and all routes explorer (ARE) frames are primarily used by end stations which use the source routing architecture to discover the route to a destination end station. Once the route has been determined, specifically routed frames (SRF) are used to send data from source to destination. As will be explained hereinafter, the SRT bridge handles these respective frames differently.

Still referring to FIG. 8A, the other sections of the RC and RD summarized as follows: the LTH section carries a 5 bit code representing length of the RI field; D is a single bit which indicates the direction; LF represents the largest frame and is 3 bits; r represents 4 bits reserved for future definition and RD1 through RDN represents both bridge number and LAN ID. A more detailed discussion of these sections and functions are set forth in the article entitled, "Table Free Bridging," by Daniel Pitt and J. L. Winkler which is incorporated herein by reference.

Figure 2:
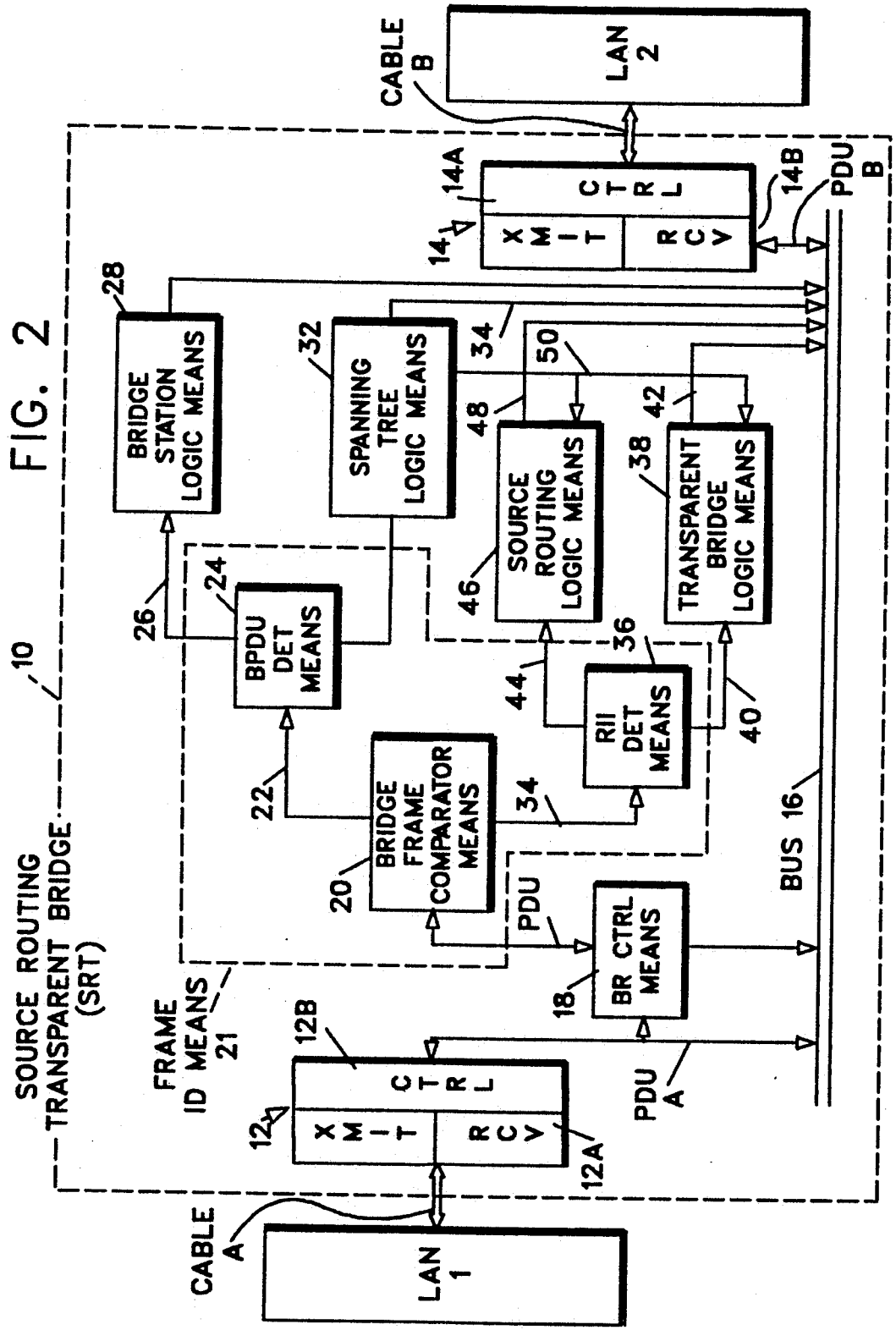
FIG. 2 shows a functional block diagram of the SRT bridge according to the teachings of the present invention.

FIG. 2 shows a block diagram of the SRT bridge 10. The SRT bridge 10 includes adapters 12 and 14 which are connected to LAN A by cable a and LAN B by cable b. The adapters are commercially available for a number of protocols including the token ring protocol. Well known adapters include the IBM Token Ring Adapter (P/N 0416F1133) details of which are set forth in a manual entitled, "Technical Reference Manual Token-Ring Network PC Adapter," and is incorporated herein by reference. Structurally, the adapter has transceiver sections 12A, 14A and a control section 12B and 14B. The transceiver sections further include transmitters and receivers which transmit data onto their respective LAN or receive data from their respective LAN. The control section provides the control which is necessary for an adapter to receive a frame structure in section 12A, remove the SD and FCS sections of the frame and forward the frame as a protocol data unit (PDU) over bus 16 to the bridge (BR) control means 18. The function of bridge control means 18 is to keep track of which adapter presents data and forward the data to the other bridge components (to be described hereinafter) for further processing. When processing is completed, the data is routed from bridge components (to be described hereinafter) over the bus to the bridge control means 18 which channel the data to the proper adapter for distribution onto the appropriate LAN.

Still referring to FIG. 2, the SRT bridge includes frame identification means 21 which examine a frame to determine its type. The frame identification means 21 further includes bridge frame comparator means 20. The function of bridge frame comparator means 20 is to examine the PDU frame and compare the address in the DA field with the bridge's address. If the destination address in the frame matches the address for the bridge, the frame is forwarded along conductor 22 to bridge protocol data unit (BPDU) detection means 24 for further processing. Since bridge frame identification means 20 is looking for PDU which matches the address of the bridge, it includes a comparator which compares the address in the DA field of the PDU with the bridge's own addresses. The comparison can be done with off-the-shelf circuit comparator or any of the well-known conventional microprocessors could be programmed to make the comparison.

There are three types of frames which could contain the bridge's address in the DA field. The three types of frames are: explicit address PDU, all station address (broadcast) PDU and group address PDU. The explicit address PDU carries a unique address which is assigned to that bridge. Usually, the address is burnt in on a ROM in the bridge. The all station address frame is a broadcast frame which goes to all stations (bridges and end stations) in the network. Stated another way, all addressable network units receive this frame. The group address frame carries a bridge group number in the DA field and is received by all network entities that have that group address. The all station address and explicit address frames are forwarded over conductor 26 to bridge end station logic means 28. It should be noted that when the explicit address and broadcast PDUs are received, they are handled by the bridge station logic means 28 as if it were an end station. The bridge end station logic means processes the received frames as any other end station would process a received frame. This functional unit (bridge station logic means) is not a part of the present invention, therefore, further detailed description will not be given. Suffice it to say, that the bridge station logic means performs similar functions as any other prior art bridge station performs. Once the processing is completed, the bridge station logic means 28 outputs the data on conductor 30 onto bus 16. The bridge controller means 18 then routes the data to the appropriate bridge adapters for routing onto the appropriate LAN.

Still referring to FIG. 2, the configuration bridge protocol data unit frames are used in the spanning tree logic means 32 to configure the bridge so that all bridges in the network form a spanning tree that allows a single path between end stations in the network. With reference to FIG. 1 for the moment, this requires that some of the SRT bridges be placed in a blocking mode whereby they do not pass certain frames from one LAN to the next while other bridges are allowed to pass these frames. The frames they are not allowed to pass while in blocking mode are those frames with RII=0 or 1 and RT=11X. If the bridges were not configured into blocking and forwarding mode, then multiple copies of the same message would appear on the LANs. For example, if bridges 2, 3 and 4 in FIG. 1 ended up in forwarding state at the completion of the configuration cycle, then bridges 1 and 5 would be in blocking state. If, at the end of the configuration cycle, bridge 1 and bridge 2 were both in forwarding state, then they would cause frames transmitted from station X to be duplicated on LAN D, LAN B and LAN C. Likewise, if bridges 3, 4 and 5 were all in forwarding state, then an infinite loop would exist. Frames transmitted by end station Y would be copied to LANs D, C, B, D, C, B . . . indefinitely.

To prevent this unacceptable result, the bridges are automatically configured in blocking or non-blocking mode. The protocol used for configuring the bridges will be described hereinafter. Suffice it to say at this point, that spanning tree logic means 32 (FIG. 2) participate in the configuration routine with other bridges in the network by sending information in the bridge protocol data unit (BPDU) over conductor 34 to bus 16 and to bridge control means 18 for redistribution to the appropriate adapter.

Still referring to FIG. 2, if the PDU is not addressed to the bridge, then the bridge frame comparator means 20 routes the frame along conductor 34 into routing information indicator (RII) detector means 36. The RII detector means 36 examines the RII bit shown in FIG. 8A. If the RII bit is set to a logical "0" (setting is done by the end station which generates the PDU), the PDU is a transparent bridge frame that has no routing information in it. Such a frame with no routing information is transported to transparent bridge logic means 38 over conductor 40. The output from transparent bridge logic means 38 (to be described hereinafter) is routed over conductor 42 to be redistributed to the respective adapter by bridge control means 18.

Still referring to FIG. 2, if the RII bit is set to a logical "1", the frame contains routing information. Such a PDU is routed over conductor 44 to be processed by source routing logic means 46. When the frame processing is completed by the source routing logic means 46, it is forwarded over conductor 48 for distribution to the respective adapter by bridge control means 18. State information (to be described hereinafter) indicating whether the bridge is set in a forwarding or blocking mode is fed over conductor 50 from spanning tree logic means 32, to source routing logic means 46 and transparent bridge logic means 38. Detailed description for each component of FIG. 2 follows.

Figure 5:
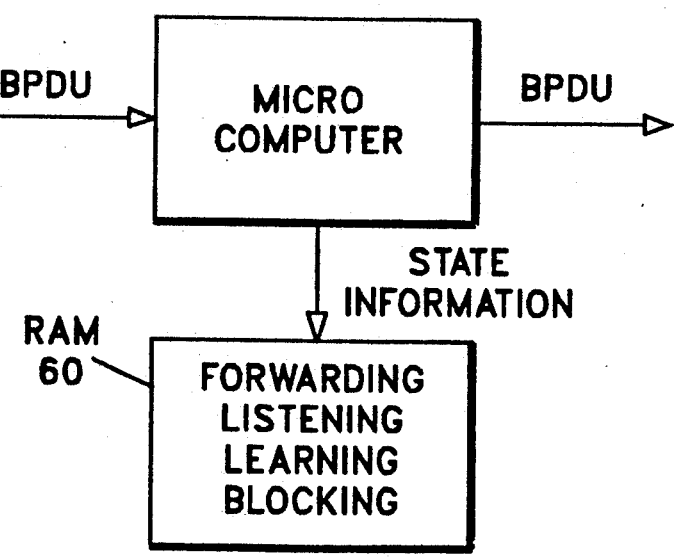
FIG. 5 shows a functional block diagram of the spanning tree logic means.
Figure 9:
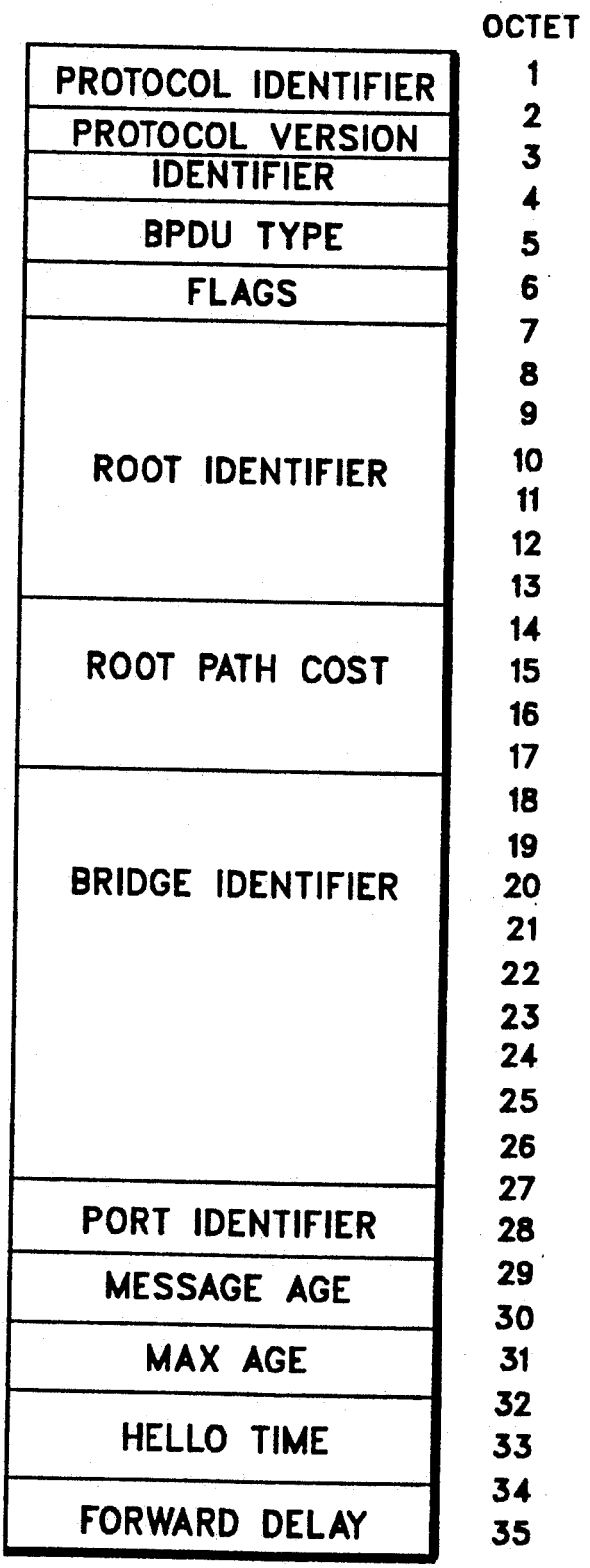
FIG. 9 shows the format and contents for the INFO field of the BPDU.

FIG. 5 shows a structure for the spanning tree logic means 32. The structure includes a programmable conventional micro computer which receives BPDU frames on its input, processes the frames and outputs BPDU frames on its output. The bridges participate in a reconfiguration procedure with other bridges to determine which bridge is placed in a forward or blocking state. The states which the bridges go through and resulting state information are stored in RAM 60. The information used to configure the bridge is transported to other bridges in the bridged network by the bridge protocol data unit (BPDU) frames. The BPDU includes a DA field, an SA field concatenated to the DA field and a INFO field concatenated to the SA field. The contents of the INFO field are shown in FIG. 9. Details of this configuration procedure is set forth in the International Standard ISO 10038 and is incorporated herein for purposes of disclosure. In essence, each bridge in a bridged network participates in the configuration process which requires the execution of a spanning tree algorithm and protocols exchanged between the bridges in the BPDU frame format (FIG. 9). A suitable program to implement the spanning tree algorithm is set forth on pages 102–138 of the International Standard ISO 10038. The program is written in C-language and can be used as is on any commercially available micro computer including the PS/2 ®. Since the operation of a computer program and a standard micro computer is well known in the art, further details will not be given here. Suffice it to say that the ISO 10038 (sections 4.6, 4.7 and 4.8) sets forth the semantics or principles of the configuration process and can be used to program a conventional micro computer or be implemented by hardware logic to carry out the configuration process.

On completion of the configuration process, all the bridges in the bridge network are placed in either a forwarding mode in which the bridge will forward frames to other LANs or in a blocking mode in which it does not pass frames. The listening and learning state which is shown in FIG. 5 represents the states that the bridge goes through before it is configured in blocking or forwarding mode. Initially, the bridge, when it first comes on-line is in the listening state. If it hears nothing from other stations on the network, it begins by sending out a BPDU frame. The process for handling such a frame and the configuration is covered by the ISO 10038 standard which is incorporated herein by reference.

Figure 3:
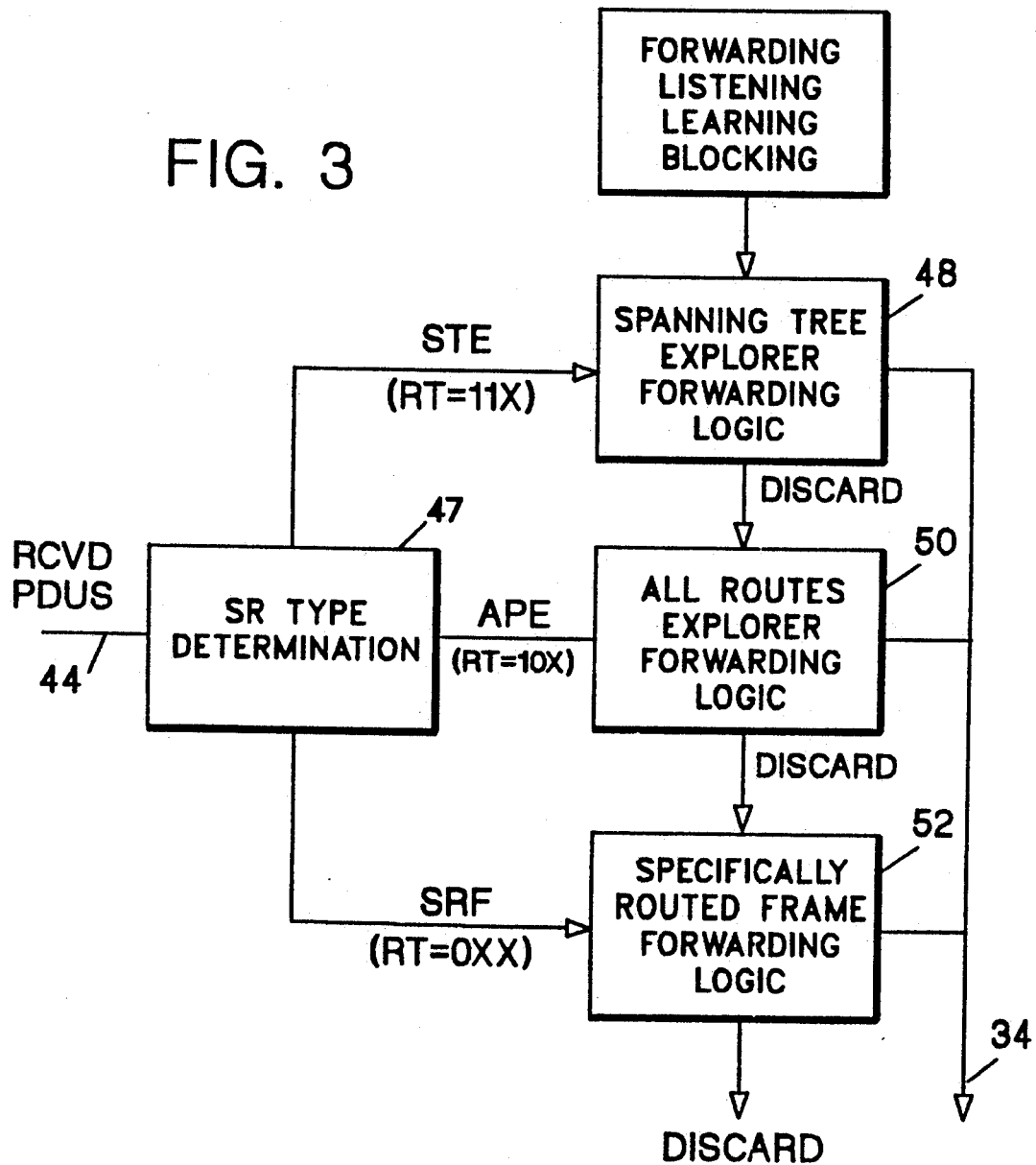
FIG. 3 shows a functional block diagram of the source routing logic means.

FIG. 3 shows a block diagram for the source routing logic means 46. The function of the source routing logic means 46 is to handle (process) frames containing routing information. As stated previously, the routing information is contained in the RI field of FIG. 8A. The source routing logic means 46 includes source routing (SR) type determination block 47 coupled through separate conductor labels STE, ARE and SRF to spanning tree explorer forward logic 48, all paths explorer forwarding logic 50 and specifically routed frame forwarding logic 52. The output from the respective logic blocks is fed to bus 34 which provides output information to bridge control means 18 (FIG. 2). The source routing logic means 46 can be implemented in hard logic or can be a micro computer program in accordance with the functional block set forth in FIG. 3. Stated information about the bridge is also available to the source routing logic means from RAM 60. In operation, received PDUs, on conductor 44, are first examined via SR type determination logic 46 for their type. This examination is done by examining the RT section of the routing information field (FIG. 8A). As stated previously, this field contains 3 bits. Depending on the bit setting, each one represents a special type frame. Determining the frame type is accomplished by comparing the RT field with the fixed and known predetermined pattern, set forth in Table I above. If RT equals 1 1 X (X being a don't care state) then the frame is a spanning tree explorer (STE frame) and is fed along the STE conductor to spanning tree explorer forwarding logic 48. If the bridge spanning tree state is forward, routine checks are done, routing information is added, and the frame is forwarded over conductor 34, bus 16 (FIG. 2), bridge control means 18 to the appropriate adapter to be transferred onto the appropriate adjacent LAN. If RT bits are set to 1 0 X, the frame is an all routes explorer (ARE). The forwarding of this type frame does not depend on the spanning tree state. Routine checks are done on this frame, routing information will be added and it will be forwarded to the adjacent LAN provided it does not already contain the LAN number in its routing information field (FIG. 8A). If the RT bits are set to 0 X X, then the frame is a specially routed frame (SRF). It will be forwarded only if the routing information in the frame matches the ring in, bridge and LAN out numbers in its path. Frames which are not forwarded are discarded as shown in the figure and are ignored. The described implementation is superior because by making a quick examination of the RII bit and the state of the bridge, processing of the frame can be done without copying the frame. This implementation expedites the performance and speed with which the bridge can process the frame.

Figure 4:
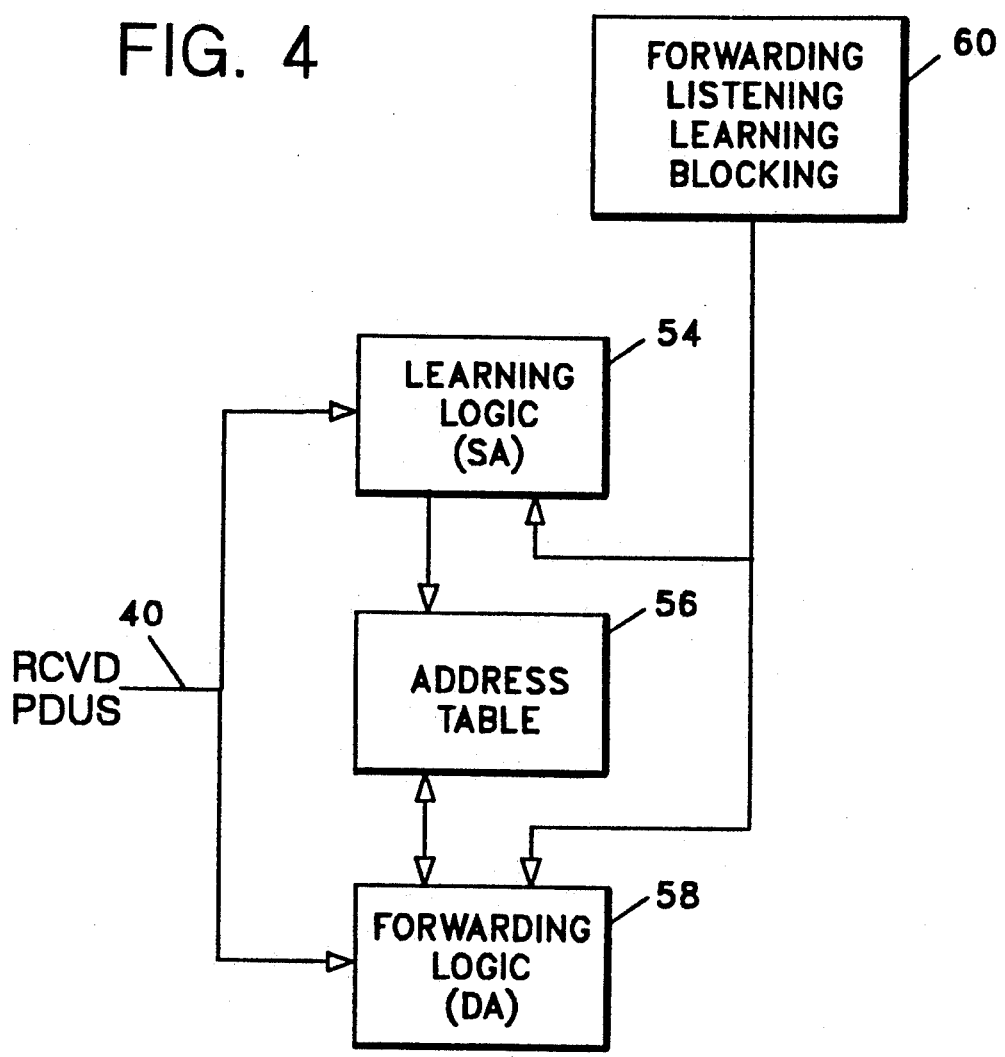
FIG. 4 shows a functional block diagram of the transparent bridge logic means.

FIG. 4 shows a block diagram for the transparent bridge logic means 38. The transparent bridge logic means 38 includes a learning logic block 54, an address table 56 and forwarding logic 58. State information is provided via RAM 60 to the respective logic blocks.

PDUs received by the transparent bridge logic are examined by the learning logic component (54). The source address (SA) of the received PDU is added to the address table (56) if it has not been previously added. The PDU is then processed by the forwarding logic (58). If the destination address (DA) is not present in the address table (56) and the state of the bridge is forwarding (from RAM 60) then the frame is forwarded over conductor 42, bus 16 (FIG. 2), bridge control means to the appropriate adapter to be transferred onto the appropriate adjacent LAN.

Figure 6:
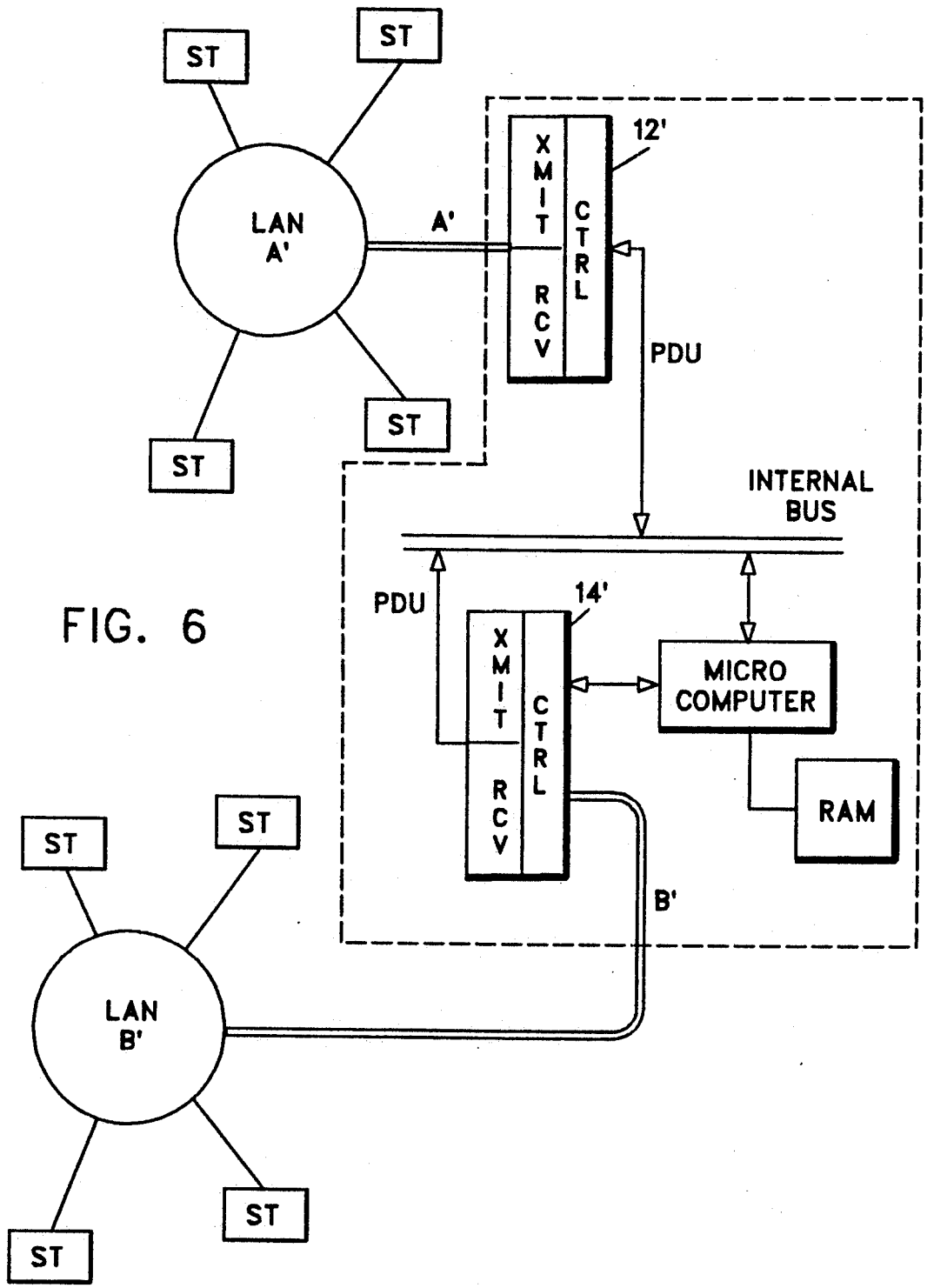
FIG. 6 shows an alternate embodiment for the SRT bridge.

FIG. 6 shows an alternative embodiment of the SRT bridge according to the teachings of the present invention. The SRT bridge includes adapters 12' and 14'. The adapters are similar to the previously described adapters 12 and 14. This being the case, details of these adapters will not be repeated here. Adapter 12' is connected by cable A' to LAN A' and adapter 14' is connected by cable B' to LAN B'. Each LAN supports a plurality of end stations labeled ST. Each adapter is connected over respective conductors to the internal bus of micro computer 62. The micro computer is connected to RAM 64. Even though the components of the SRT bridge are shown displaced, in actuality, the adapters bus RAM would be mounted on the mother board of micro computer 62. Thus, the showing in FIG. 6 is merely representative of the actual embodiment. Any conventional programmable micro computer such as Intel ®80286 or the like can be used.

Figure 7:
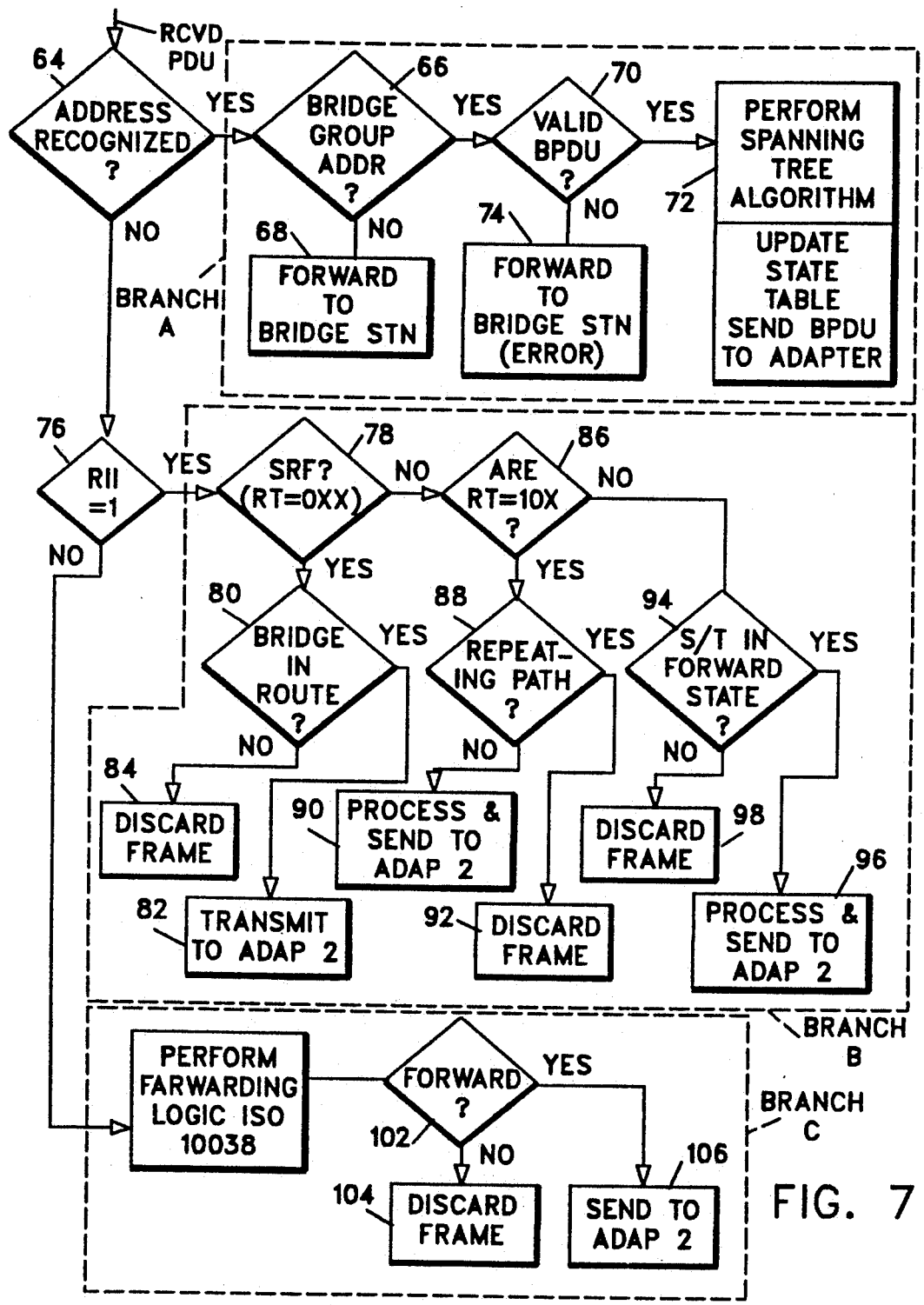
FIG. 7 shows a flow chart for controlling a computer used in the embodiment of FIG. 6.

FIG. 7 shows a flow chart of a program which, if executed in micro computer 62, allows the SRT bridge to transfer source routing data and transparent bridging data. The logic of the flow chart includes branch A, branch B and branch C. Branch A handles PDUs that are addressed to a bridge. Branch B handles source routing PDUs that are received by the bridge. Branch C handles transparent bridging PDUs received by the bridge. In operation, a received PDU accesses decisional block 64. The block tests the destination address in the PDU to see if it is recognized. This is done by a simple comparison process. If the address matches the bridge's individual address or a group or broadcast address, the frame is passed to block 66. In block 66, the address is checked to see if it is a group address. If it is not a group address, the PDU is forwarded to functional block 68. In functional block 68, the PDU is forwarded to the bridge end station for further processing. If the frame is to a group address (block 66) the frame is then forwarded to decisional block 69. In decisional block 69, the frame is tested to see if the group address is the defined group address for bridges. If it is not this address, then a copy of the frame is forwarded to the bridge station (68) and a copy is forwarded for RII comparison (76). If the group address is the defined group address for bridges, the frame is tested to see if it is a valid BPDU. This is done by examining and processing selected fields of the BPDU set forth in FIG. 9 and processing said fields in accordance with the ISO 10038 configuration protocol and spanning tree algorithm incorporated herein by reference. If the frame is a valid BPDU frame, it is forwarded to decisional block 72. In decisional block 72, the frame is used to perform the spanning tree algorithm, update state table, send new BPDU to adapter 2 for transmission on LAN B. If the frame is not the valid BPDU, it is forwarded to the bridge station (block 74).

Still referring to FIG. 7, if the address of the PDU is not recognized (block 64) or the frame contains a group address not the same as the bridge group address, the PDU is transported to block 76. In decisional block 76, RII bit is examined. If the bit is set to "1", the PDU is forwarded to branch B. In branch B, the frame is processed by decisional block 78. The block tests to see if the PDU is a SRF PDU. This is done by examining the setting of the RT bits. If the bits are set to 0 X X, the frame is forwarded to decision block 80. In decisional block 80, the frame is checked to see if the bridge is in the route. If it is, the frame is forwarded to decisional block 82 where it is transferred to adapter 14' for transmission on LAN B. If the bridge is not in the route, the frame is then discarded (functional block 84).

If the RT bits are set to 1 0 X (decisional block 86), the PDU is fed to decisional block 88 where the frame is checked to see if it is repeating the path. If it is not, it is sent to functional block 90 where it is processed (by the adding of routing information and other processors). If the frame is repeating path (block 88) it is discarded (block 92). If the PDU frame is not a SRF or ARE frame, it is a STE frame and it is transported into decisional block 94. In decisional block 94, the state of the bridge is checked. If the bridge is in a forward state, the frame is sent to the adapter 14' or 14 (functional block 96). If the bridge is in a blocking mode (block 94), the frame is discarded (block 98).

Still referring to FIG. 7, if the RII bit is set to a logical "0" (block 76), the frame is a transparent bridge frame. This means that it has no routing information in it. The frame is then forwarded to branch C. In branch C, the frame is processed according to the standard ISO 10038. In essence, the destination address of the frame is used together with the table information in the bridge for forwarding or not forwarding the frame. If the frame is not forwarded (block 102), it is discarded (block 104). If the frame is forwarded, it is sent to adapter 14' which outputs it on the appropriate LAN (block 106).

The SRT bridge allows the forwarding of both source routing and transparent bridge frames. In operation, when the bridges of the bridged network are activated, they are all activated in a listening state. If a bridge hears silence on its respective ports, it outputs a special configuration bridge protocol data unit frame which is used by other bridges to execute a spanning tree algorithm. When the bridge configuration process is completed, each bridge is configured in a forward or blocking state so that a single path exists between end stations on different networks of the bridged network. Following the configuration end stations wishing to communicate with end stations on other bridges generate appropriate SRT frames. The SRT frames are characterized by setting the RII bit to a "1" if the station practices the source routing architecture and the bit is set to a "0" by stations practicing the transparent bridging architecture. The frame is then transmitted on the source LAN to which the station is connected. When the bridge receives a frame, it examines the address in the DA field of the frame. If the bridge does not recognize the address, it is routed along a path which includes a RII detection circuitry for testing the RII bit. PDUs having their RII bit set to a 1 are processed via source routing logic in the bridge, while PDUs having the RII bit set to a "0" are processed by transparent bridge logic means in the bridge. This concludes the detailed description of the invention.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A method for transmitting messages packaged as frames in an interconnected communications network formed by a plurality of independent communications network connected by interconnecting devices with each communications network having a plurality of stations connected to a transmission media, said method comprising the steps of:
   (a) receiving, at each interconnecting device, frames having at least a source address, a destination address and a routing information indicator (RII) bit;
   (b) examining the frame;
   (c) if the frame is a bridge protocol data unit (BPDU) frame, executing a spanning tree algorithm and its associated bridge protocols to set the interconnecting device in a "forwarding state" which allows frames to be transmitted from one network through the interconnecting device to another network or to set the interconnecting device in a "blocking state" which can prevent the transmission of certain frames through the interconnecting device;
   (d) if the frame is not a BPDU, examining the RII bit;
   (e) if the RII bit is set in a first state and the bridge is set in the forwarding state, using routing information contained in the frame to route the frame to the destination address; and
   (f) if the RII bit is set in a second state and the bridge is set in the forwarding state, using the destination address in the frame and look up tables in the interconnecting device to route the frame to its destination address.

2. The method set forth in claim 1 wherein the first state is a logical "1".

3. The method set forth in claim 1 wherein the second state is a logical "0".

4. An improved device for interconnecting LANs into a unified interconnected network so that an end station on one LAN communicates with an end station on another LAN, said device comprising in combination:
   an adapter means for receiving frames from the LAN;
   a frame identification means for examining the frames to determine frame type according to a predetermined classification type;
   a spanning tree logic means for receiving frames which are classified as bridge protocol data unit (BPDU) frames from the unified interconnected network, said spanning tree logic means executing a spanning tree algorithm contained in said device and using the BPDU frames to exchange information with other devices in the unified interconnection network so that a single communication path for interconnecting end stations connected to different LANs is established;
   a source routing logic means for receiving source routing frames from the end station coupled to the frame identification means; said source routing logic means providing source routing functions which modify or forward the source routing frames; and
   a transparent bridge logic means for receiving transparent routing frames from the end station coupled to the frame identification means; said transparent bridge logic means providing transparent routing functions for forwarding transparent routing frames based on a destination address carried in the frame and a state of the device.

5. The improved device of claim 4 further including a bridge end station logic means, coupled to the frame identification means for processing frames addressed to the device.

6. The improved device of claim 5 wherein the frame identification means includes a comparator means for comparing a destination address in the frame with the device's own local address; said comparator means channelling the frame along a first path if the address matches and channelling the frame along a second path if the addresses do not match;

a bridge protocol data unit (BPDU) detecting means coupled to the first path; said (BPDU) detecting means examining frames received on said first path and forwarding the BPDU frames to the spanning tree logic means for further processing and forwarding non-(BPDU) frames to the bridge end station logic means; and a routing information indicator, (RII) means coupled to the second path; said routing information indicator means examining a RII bit in the frame and routing the frame to the source routing logic means if the RII bit is set in a first state and forwarding the frame to the transparent bridge logic means if the bit is set in a second state.

7. A device for interconnecting local area networks, having source routing nodes and transparent bridging nodes, into a unified interconnected network comprising:

a first means responsive to a bridge configuration frame received from the unified network for executing a spanning tree algorithm and setting the device in a state for transmitting frames or a state for blocking frames;

second means for determining if the frames are transmitted from source routing nodes or transparent bridging nodes;

source routing means for applying source routing methods and forward frames from the source routing nodes, only if the device is set in the state for forwarding frames; and transparent bridge routing means for applying transparent bridge routing methods and forwarding frames from the transparent bridge nodes, only if the device is set in the state of forwarding frames.

* * * * *

UNITED STATES PATENT AND TRADEMARK OFFICE
CERTIFICATE OF CORRECTION

PATENT NO. : 5,280,480

DATED : Jan. 18, 1994

INVENTOR(S) : Daniel A. Pitt, Kirk A. Preiss

It is certified that error appears in the above-identified patent and that said Letters Patent is hereby corrected as shown below:

Col. 12, lines 54 & 55, "interconnection" should be --interconnected--;

Col. 14, line 9, after "unified" insert --interconnected--; and

Col. 14, line 22, change "bridge" to --bridging--.

Signed and Sealed this

Third Day of May, 1994

Attest:

BRUCE LEHMAN

Attesting Officer

Commissioner of Patents and Trademarks